(12) United States Patent
Tamura et al.

(10) Patent No.: US 7,849,982 B1
(45) Date of Patent: Dec. 14, 2010

(54) GARNISH PLATE MOUNTING STRUCTURE

(75) Inventors: Shunsuke Tamura, Wako (JP); Takahiro Hazeki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/796,967

(22) Filed: Jun. 9, 2010

(30) Foreign Application Priority Data

Jun. 25, 2009 (JP) .............................. 2009-151507

(51) Int. Cl.
*F16D 65/38* (2006.01)

(52) U.S. Cl. .............................. 188/250 G; 188/250 B; 188/73.43

(58) Field of Classification Search ................ 188/72.4, 188/73.39, 73.42, 73.46, 73.47, 250 B, 250 G
See application file for complete search history.

(56) References Cited

U.S. PATENT DOCUMENTS

| | | | | |
|---|---|---|---|---|
| 6,170,620 B1 * | 1/2001 | Akita et al. | ............. | 188/251 A |
| 6,257,379 B1 * | 7/2001 | Matsumoto et al. | ...... | 188/73.31 |
| 6,340,076 B1 * | 1/2002 | Tsuchiya | ................. | 188/73.45 |
| 7,370,736 B2 * | 5/2008 | Anda et al. | .............. | 188/73.36 |
| 7,481,304 B2 * | 1/2009 | Tsurumi et al. | .......... | 188/73.36 |
| 2004/0163903 A1 * | 8/2004 | Saka | ...................... | 188/250 G |
| 2007/0023240 A1 * | 2/2007 | Dessouki et al. | ......... | 188/73.37 |
| 2009/0152056 A1 * | 6/2009 | Heinz et al. | ................ | 188/72.5 |

FOREIGN PATENT DOCUMENTS

JP   2005-282758 A   10/2005

* cited by examiner

*Primary Examiner*—Christopher P Schwartz
(74) *Attorney, Agent, or Firm*—Carrier Blackman & Associates, P. C.; William D. Blackman; Joseph P. Carrier

(57) ABSTRACT

A garnish plate mounting structure allows a garnish plate to be installed to a caliper body without the need for any special machining of the caliper body, thus achieving improved general versatility. An engaging member is disposed along an external surface of a second pad opposing an arm portion of the caliper body. The engaging member has engaging portions which engage the second pad. The engaging member is held between the arm portion and the second pad. The garnish plate is disposed at an external surface of the caliper body and connected to the engaging member through the intermediary of connecting portions provided extendedly on both sides of the engaging portion.

1 Claim, 3 Drawing Sheets

GARNISH PLATE MOUNTING STRUCTURE

BACKGROUND OF THE INVENTION

1. Field of the Invention

The present invention relates to a mounting structure of a garnish plate installed to an external surface of a caliper body of a floating type disc brake device used with an automobile or the like.

2. Description of the Related Art

Hitherto, there has been known a disc brake device equipped with a caliper body having a base portion which opposes one side surface of a disc rotor rotating together with a wheel and into which a piston is inserted, an arm portion opposing the other side surface of the disc rotor, and a bridge portion extending over the disc rotor to connect the base portion and the arm portion, a pair of pads interposed between the piston and the disc rotor and between the arm portion of the caliper body and the disc rotor, and a caliper bracket slidably supporting the two pads in the axial direction of the disc rotor, wherein the two pads are pressed against the side surfaces of the disc rotor to implement braking. In this disc brake device, the arm portion of the caliper body has a large cutout at the center of the arm portion of the caliper body to permit easier machining of the cylinder into which the piston is inserted (e.g., Japanese Patent Application Laid-Open No. 2005-282758).

There has been also known a disc brake device in which a garnish plate is secured to the external surface of the arm portion of the caliper body by rivets or screws to cover the cutout part at the center of the arm portion, thereby improving the appearance thereof.

The conventional garnish plate mounting structures require the caliper body be provided with a fixing portion for rivets or screws in order to fix the garnish plate to the caliper body by the rivets or the screws. This means that the garnish plate cannot be installed to a caliper body without the aforesaid fixing portion, posing a problem of poor general versatility.

SUMMARY OF THE INVENTION

Accordingly, an object of the present invention is to provide a garnish plate mounting structure which allows a garnish plate to be installed without adding any special machining to a caliper body, thus improving general versatility.

To this end, the present invention provides a mounting structure of a garnish plate to be installed to a disc brake device which includes a disc rotor rotating together with a wheel, a caliper body having a base portion which opposes one side surface of the disc rotor and into which a piston is inserted, an arm portion opposing the other side surface of the disc rotor, and a bridge portion extended over the disc rotor to connect the base portion and the arm portion, a first pad interposed between the piston and the disc rotor, a second pad interposed between the arm portion of the caliper body and the disc rotor, and a caliper bracket which supports the first pad and the second pad slidably in the axial direction of the disc rotor, wherein the first pad and the second pad are pressed against the side surfaces of the disc rotor to implement braking. The mounting structure includes an engaging member provided with an engaging portion which is disposed along an outer surface of the second pad opposing the arm portion and which engages the second pad, wherein the engaging member is held between the arm portion and the second pad, the garnish plate is disposed at an external surface of the caliper body, and the engaging member is connected to the garnish plate by a connecting portion extended toward the garnish plate.

According to the present invention, the engaging member connected to the garnish plate through the intermediary of the connecting portion is engaged with the garnish plate by holding the second pad by the engaging portion thereof and held between the arm portion of the caliper body and the second pad. This arrangement makes it possible to install the garnish plate merely by providing the engaging member without the need for adding special machining to the caliper body, thus permitting improved general versatility.

DESCRIPTION OF THE PREFERRED EMBODIMENTS

Figure 1:
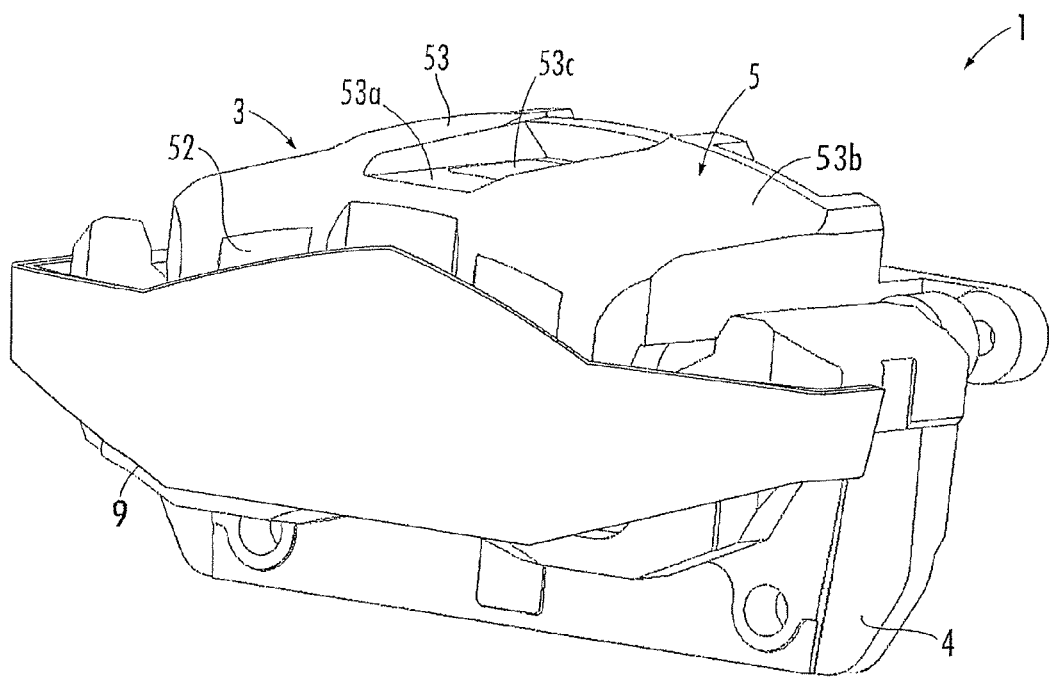
FIG. 1 is a perspective view illustrating a disc brake device using an embodiment of a garnish plate mounting structure in accordance with the present invention.

An embodiment of a garnish plate mounting structure in accordance with the present invention will be described by using an automotive disc brake device 1 illustrated in FIG. 1 to FIG. 3. The disc brake device 1 has a disc rotor 2 which rotates together with a wheel (refer to FIG. 2) and a floating type caliper mechanism 3, which is fixed to a vehicle body side, e.g., a knuckle, and holds the disc rotor 2 by a pair of pads to effect braking.

The caliper mechanism 3 has a caliper bracket 4 fixed to the vehicle body side, e.g., a knuckle, a caliper body 5 installed to the caliper bracket 4 movably in the axial direction of the disc rotor 2 through the intermediary of a slide pin (not shown), and a pair of pads 71 and 72, which are disposed to hold the disc rotor 2 sideways therebetween and which are supported by the caliper bracket 4 such that they are free to slide in the axial direction of the disc rotor 2 through the intermediary of a retainer (not shown). The pads 71 and 72 are formed of linings 71*a* and 72*a* slidably in contact with the side surfaces of the disc rotor 2, and metallic back plates 71*b* and 72*b* retaining the linings 71*a* and 72*a*, respectively.

Figure 2:
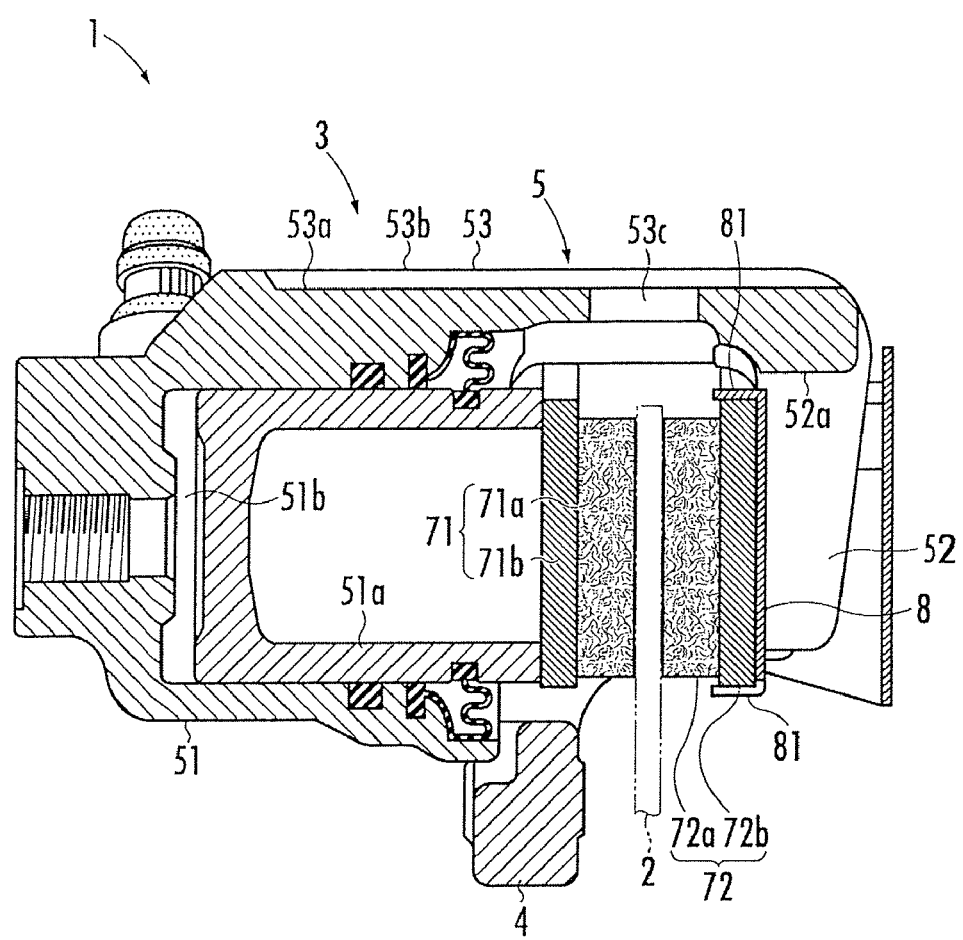
FIG. 2 is a sectional view of the disc brake device according to the embodiment.
Figure 3:
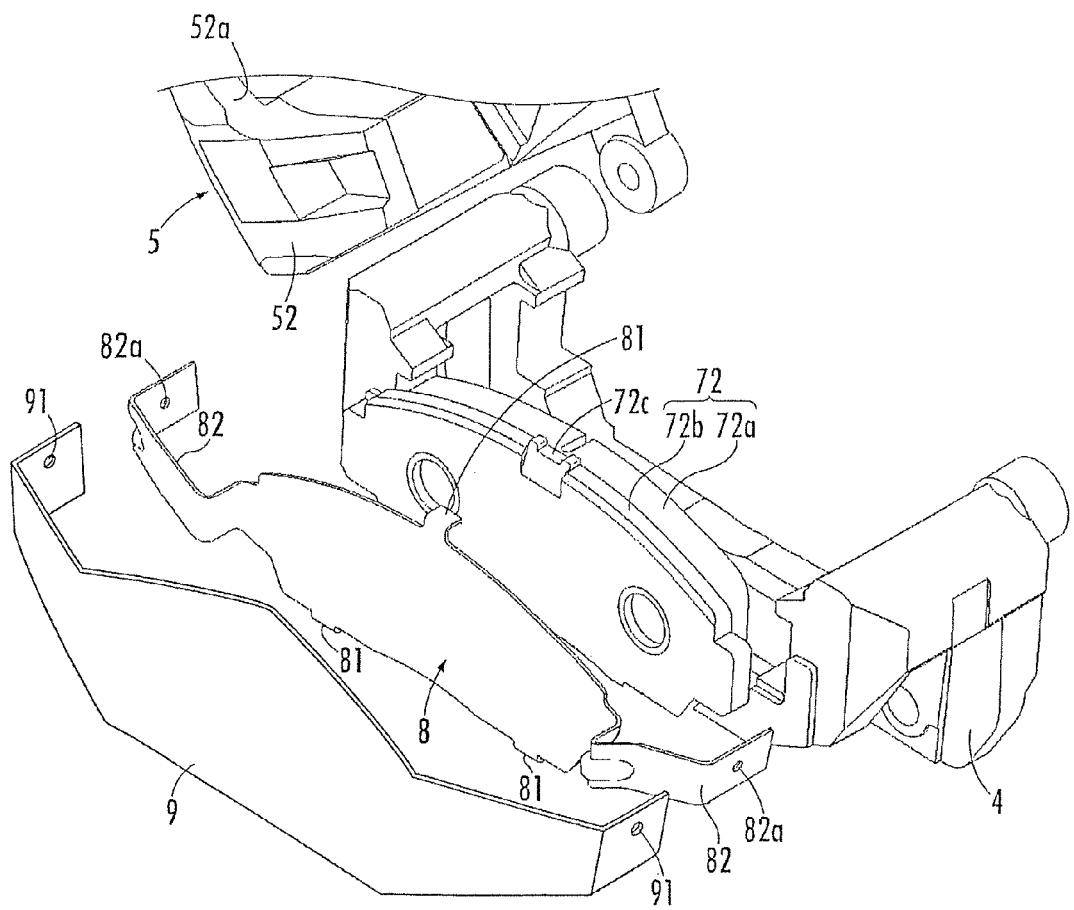
FIG. 3 is an exploded view of the disc brake device according to the embodiment.

As illustrated in FIG. 2, the caliper body 5 is constructed of a base portion 51 opposing one side surface of the disc rotor 2, an arm portion 52 opposing the other side surface of the disc rotor 2, and a bridge portion 53 extended over the disc rotor 2 to connect the base portion 51 and the arm portion 52.

A piston 51*a* is inserted in the base portion 51 such that the piston 51*a* is free to slide in the axial direction of the disc rotor 2. The base portion 51 and the piston 51*a* define a hydraulic chamber 51*b*. Further, a first pad 71 is interposed between the piston 51*a* and the disc rotor 2, and a second pad 72 is interposed between the arm portion 52 and the disc rotor 2.

In the caliper mechanism 3, when hydraulic oil is supplied into the hydraulic chamber 51*b*, the piston 51*a* presses the first pad 71 against the disc rotor 2. At the same time, a reaction force from a pressing force of the piston 51*a* causes the caliper body 5 to move in a direction opposite from the direction of the pressing force of the piston 51*a* and to press the second pad 72 against the disc rotor 2 through the intermediary of the arm portion 52, thereby braking the disc rotor 2.

The bridge portion 53 has a thin portion 53a, which has a thin wall for the purpose of a weight reduction, at the center thereof, while the rest of the bridge portion 53 is formed of a thick portion 53b, which has a thick wall to enhance the strength of the connection between the base portion 51 and the arm portion 52. A window 53c is formed at the center of the thin portion 53a to permit visual check on the wear on the pads 71 and 72.

The arm portion 52 has a large cutout 52a, which has been cut from the distal end toward the proximal end thereof (refer to FIG. 2) into a bifurcate shape. This makes it possible to easily machine the base portion 51 into which the piston 51a is inserted through the cutout 52a.

A plate-shaped shim 8 is disposed along the external surface of the back plate 72b at between the second pad 72 and the arm portion 52. One engaging portion 81 is formed on the upper edge of the shim 8, and two engaging portions 81 are formed on the lower edge of the shim 8. These engaging portions 81 are bent to fit onto the top and bottom rims of the back plate 72b so as to hold and engage the back plate 72b from top and bottom. The upper rim of the back plate 72b has a recession 72c with which the engaging portion 81 meshes so as to enable the shim 8 to be positioned in relation to the back plate 72b. In the present embodiment, the shim 8 corresponds to the engaging member in the present invention.

The external surface of the caliper body 5 is provided with a garnish plate 9 disposed along the external surface of the arm portion 52. Further, the right and left ends of the shim 8 have connecting portions 82, which extend from the right and left outer sides of the arm portion 52 toward the garnish plate 9 and also extend along the inner surface of the garnish plate 9 at the same time. Each of the connecting portions 82 has a through hole 82a. The garnish plate 9 has through holes 91 that match the through holes 82a. Thus, the garnish plate 9 is fixed to the shim 8 by riveting the through holes 82a and 91.

The arm portion 52 is positioned between the garnish plate 9 and the shim 8 and is free to push the second pad 72 through the intermediary of the shim 8.

The mounting structure of the garnish plate 9 makes it possible to install the garnish plate 9 to the disc brake device 1 simply by engaging the shim 8, which is an engaging member, with the pad 72, which is a general part, without the need for modifying the design of the caliper bracket 4 or the caliper body 5. Thus, the garnish plate 9 can be easily mounted on the existing disc brake device 1, permitting improved general versatility.

What is claimed is:

1. A mounting structure of a garnish plate to be installed to a disc brake device which includes a disc rotor rotating together with a wheel, a caliper body having a base portion which opposes one side surface of the disc rotor and into which a piston is inserted, an arm portion opposing the other side surface of the disc rotor, and a bridge portion extended over the disc rotor to connect the base portion and the arm portion, a first pad interposed between the piston and the disc rotor, a second pad interposed between the arm portion of the caliper body and the disc rotor, and a caliper bracket which supports the first pad and the second pad slidably in the axial direction of the disc rotor, wherein the first pad and the second pad are pressed against the side surfaces of the disc rotor to implement braking, the mounting structure comprising:

an engaging member having an engaging portion which is disposed along an outer surface of the second pad opposing the arm portion and which engages the second pad, wherein the engaging member is held between the arm portion and the second pad, the garnish plate is disposed at an external surface of the caliper body, and the engaging member is connected to the garnish plate by a connecting portion extended toward the garnish plate.

* * * * *